C. A. WHEELER.
LOCKING DEVICE FOR AUTOMOBILE CRANKS.
APPLICATION FILED JUNE 20, 1911.
1,026,189.
Patented May 14, 1912.
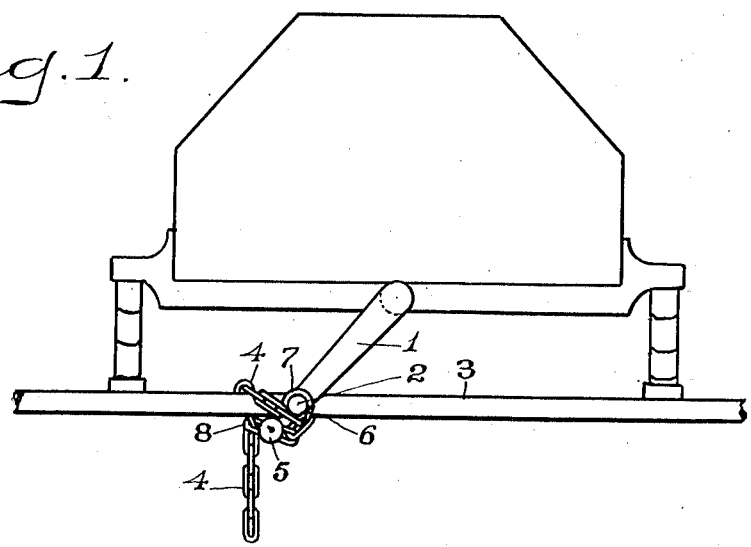
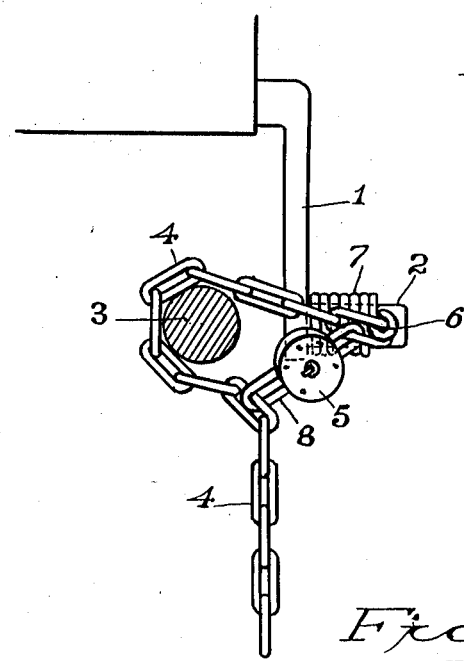
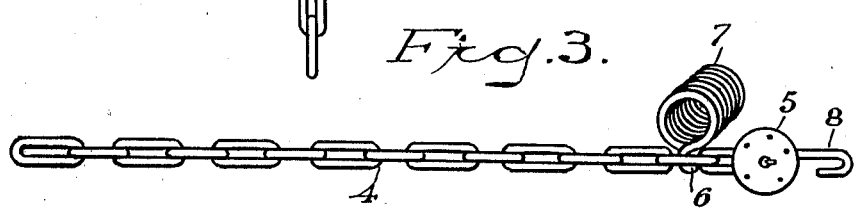
WITNESSES:
H. A. Lamb.
M. J. Lougden.
INVENTOR
Chas. A. Wheeler.
BY 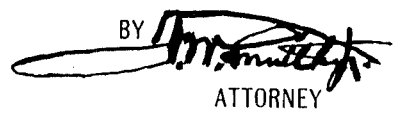
ATTORNEY

UNITED STATES PATENT OFFICE.

CHARLES A. WHEELER, OF BRIDGEPORT, CONNECTICUT, ASSIGNOR OF ONE-HALF TO THE SMITH & EGGE MANUFACTURING CO., OF BRIDGEPORT, CONNECTICUT, A CORPORATION OF CONNECTICUT.

LOCKING DEVICE FOR AUTOMOBILE-CRANKS.

1,026,189. Specification of Letters Patent. Patented May 14, 1912.

Application filed June 20, 1911. Serial No. 634,311.

*To all whom it may concern:*

Be it known that I, CHARLES A. WHEELER, a citizen of the United States, residing in the city of Bridgeport, county of Fairfield, and State of Connecticut, have invented certain new and useful Improvements in Locking Devices for Automobile-Cranks; and I do declare the following to be a full, clear, and exact description of the invention, such as will enable others skilled in the art to which it appertains to make and use the same.

My invention relates to certain new and useful improvements in locking devices for automobile cranks, and has for its object to provide a simple and effective appliance of this nature, and with this end in view my invention consists in certain details of construction and combination of parts hereinafter fully described and then particularly pointed out in the claims which conclude this description.

In the accompanying drawing Figure 1 is a front elevation illustrating my improvement in locking position on the crank handle of an automobile—Fig. 2 a broken side elevation, partly in section, of the construction shown at Fig. 1, and Fig. 3 a detail elevation of my improved device.

Similar numerals of reference denote like parts in the several figures of the drawing.

1 represents the crank lever of an automobile and 2 the handle of said lever.

3 represents the automobile axle.

My improvement comprises any suitable chain 4 one end of which is permanently connected with a suitable padlock 5. Pivoted at 6 to one of the chain links near the padlock is an elongated socket 7 which may be made in any suitable manner, in the present instance this socket being formed by coils of wire.

In applying my improvement to lock an automobile crank the socket 7 is slipped over the handle 2 and the chain 4 then passed around the axle and engaged with the shackle 8 of the padlock, and said shackle is then forced into locking position. Any unnecessary slack in the chain may be taken up either by passing it several times around the axle or by engaging any convenient link with the shackle after the chain has been pulled taut leaving the free end of the chain to hang loosely as shown at Figs. 1 and 2. In some instances it may be found convenient to lock the crank by passing the chain around any convenient stationary portion of the automobile other than the axle, and of course my invention is not limited in this respect.

What I claim as new and desire to secure by Letters Patent is:—

1. A locking device for automobile cranks, including a chain, a pad-lock connected to one end of the chain, and an elongated socket formed of a series of wire convolutions, one end of the wire being pivotally connected to the chain, the socket being for the reception of the crank handle, and the chain being adapted to be passed around the stationary part of the automobile and connected to the pad-lock shackle.

2. A locking device to prevent rotation of automobile cranks, including a socketed member designed to be received over the crank handle, a chain connected to said member for engagement with a stationary part of the automobile by passing the chain around said stationary part, said chain when drawn taut causing the inner end of said member to abut the crank, and a padlock carried by the chain to hold same taut.

In testimony whereof I affix my signature in presence of two witnesses.

CHARLES A. WHEELER.

Witnesses:
F. W. SMITH, Jr.,
M. T. LONGDEN.